Aug. 3, 1943.   C. E. CUSACK ET AL   2,326,094
APPARATUS FOR ROASTING COFFEE
Filed Oct. 8, 1940   7 Sheets-Sheet 1

INVENTORS:
Charles E. Cusack
Hans H. Berger

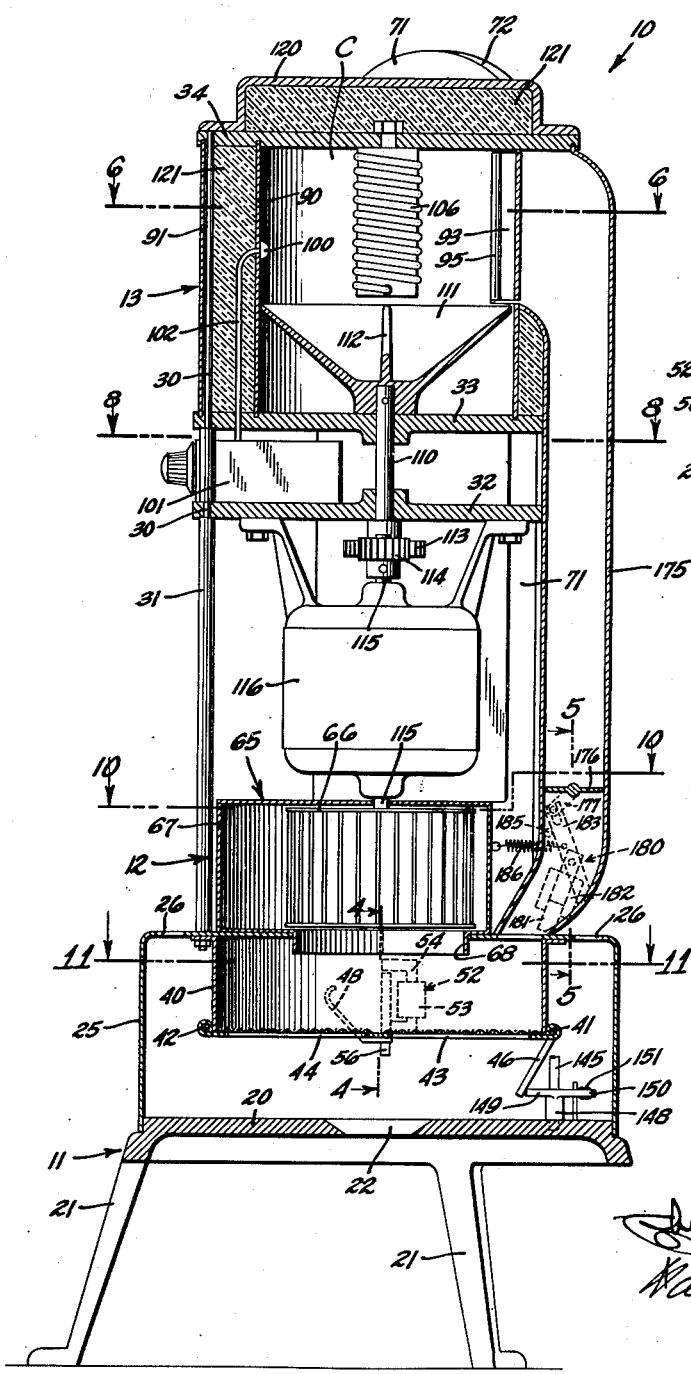
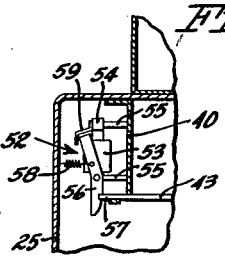
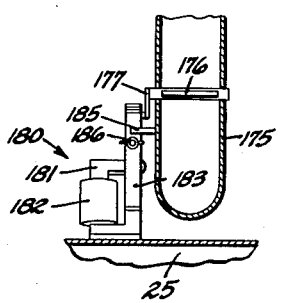

Aug. 3, 1943.  C. E. CUSACK ET AL  2,326,094
APPARATUS FOR ROASTING COFFEE
Filed Oct. 8, 1940  7 Sheets-Sheet 3

INVENTORS:
Charles E. Cusack
Davis W. Berger

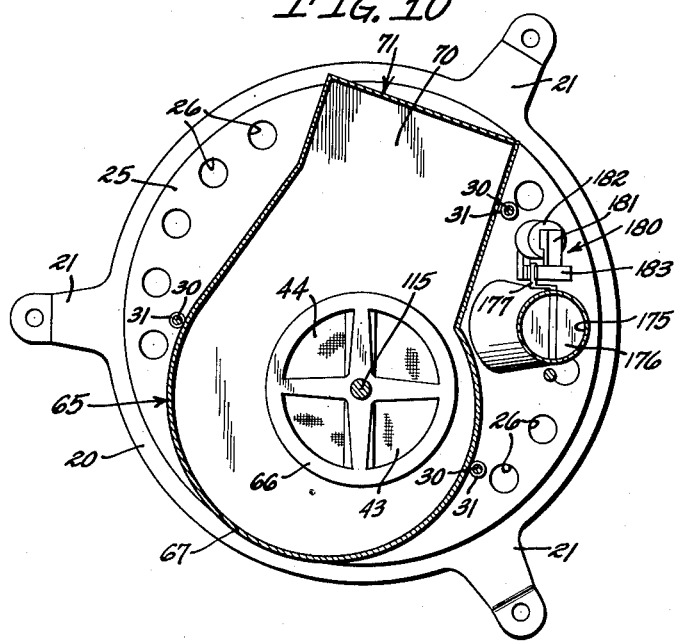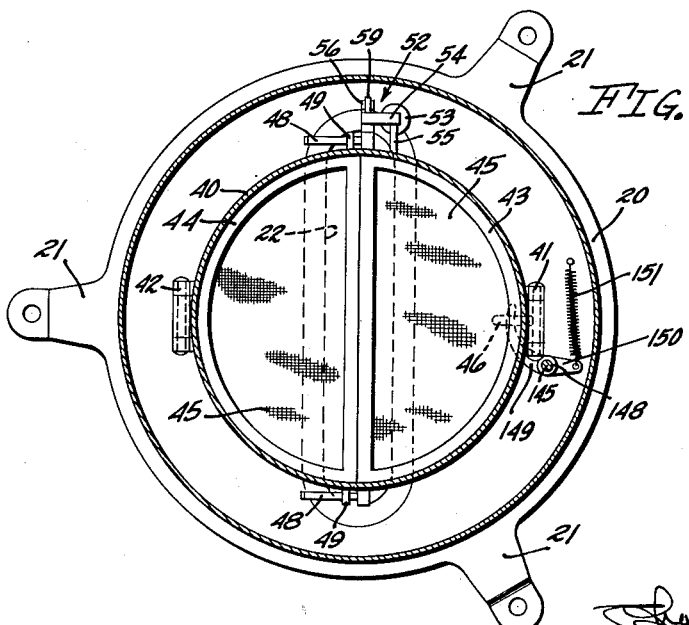

Aug. 3, 1943. C. E. CUSACK ET AL 2,326,094
APPARATUS FOR ROASTING COFFEE
Filed Oct. 8, 1940 7 Sheets-Sheet 5
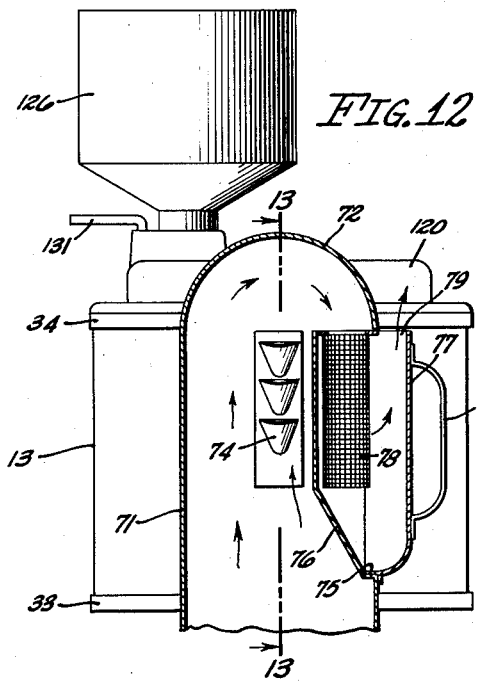
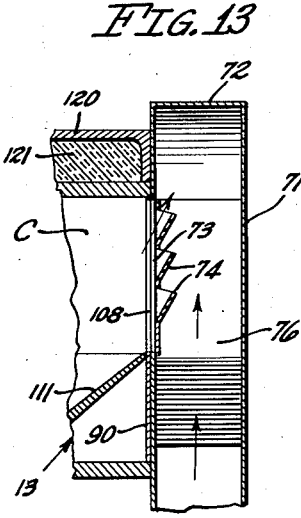
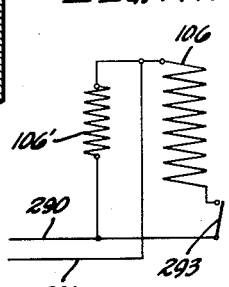
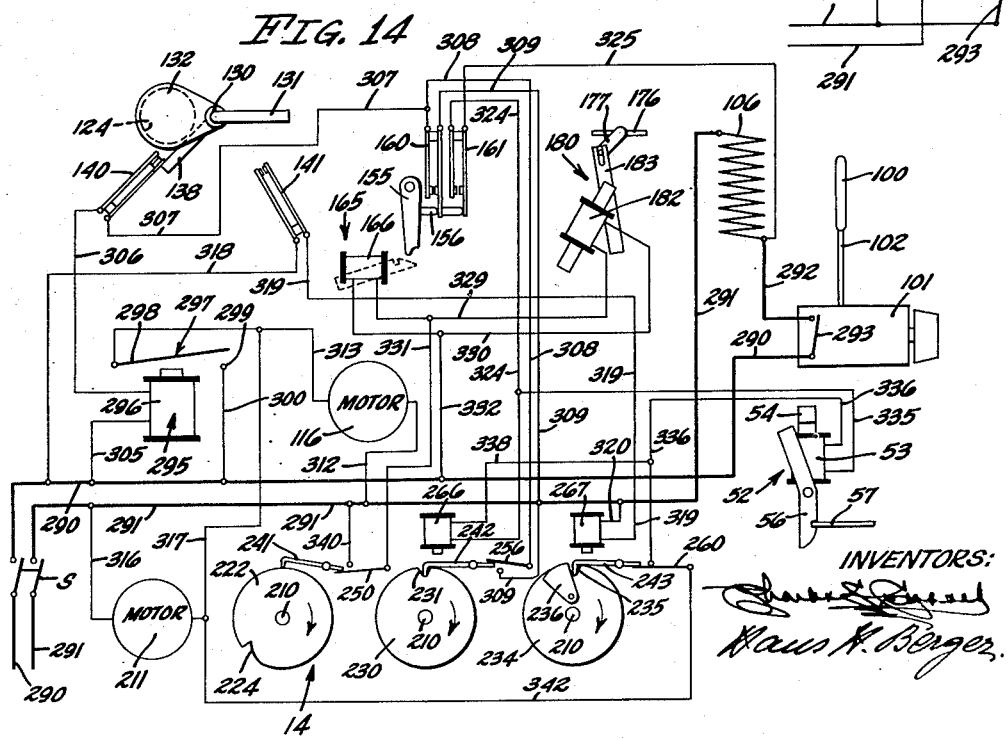
INVENTORS:

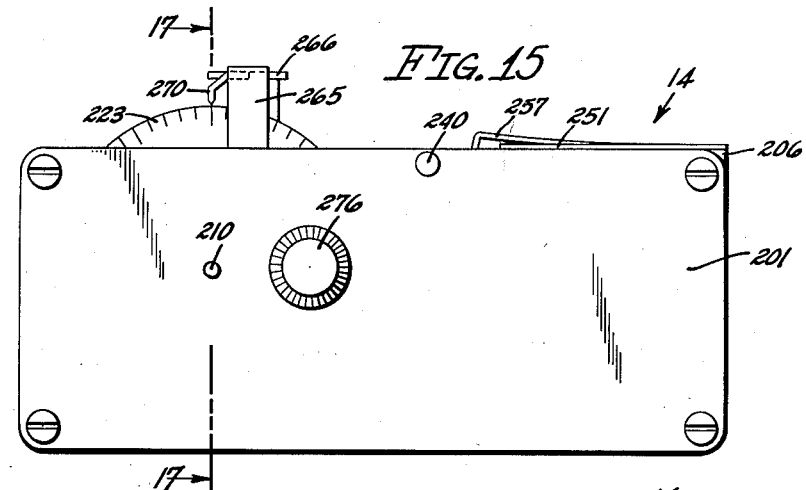
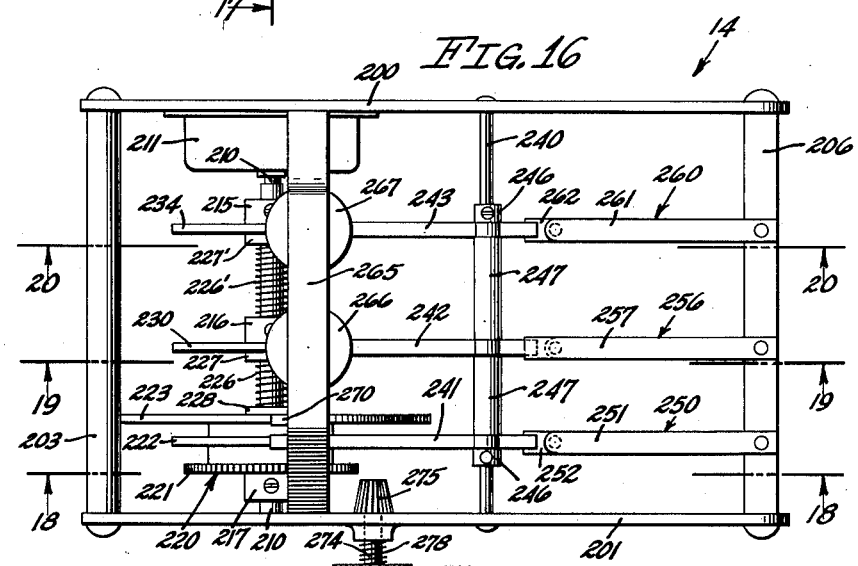
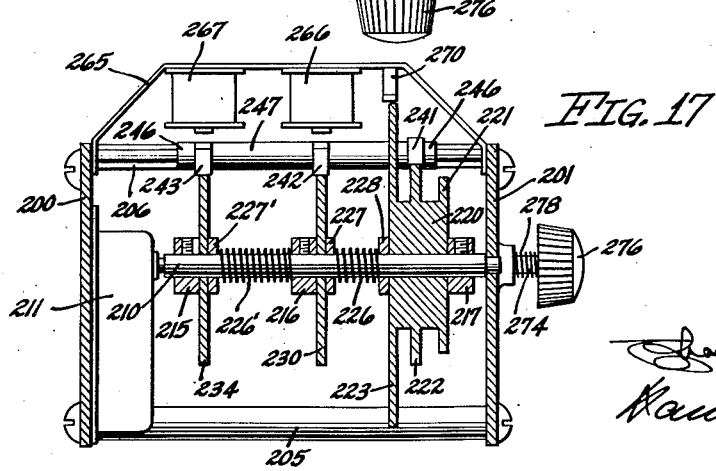

Aug. 3, 1943. C. E. CUSACK ET AL 2,326,094
APPARATUS FOR ROASTING COFFEE
Filed Oct. 8, 1940 7 Sheets-Sheet 7

INVENTORS:
Hans H. Berger

Patented Aug. 3, 1943

2,326,094

UNITED STATES PATENT OFFICE 2,326,094

APPARATUS FOR ROASTING COFFEE

Charles E. Cusack and Hans H. Berger, Los Angeles, Calif., assignors to The McCass Company, Los Angeles, Calif.

Application October 8, 1940, Serial No. 360,308

12 Claims. (Cl. 34—45)

This application relates generally to the roasting of food stuffs and more particularly to a novel apparatus for roasting coffee berries and the like.

The practice generally followed in merchandising coffee is to roast large quantities of green coffee in roasting plants and package the roasted coffee for retail distribution. A major problem encountered in this practice is that of maintaining as much of the flavor of the coffee as possible during the time between the roasting process and the consumption of the coffee.

After the coffee berries are harvested and treated for shipment, they may be stored for a considerable length of time before roasting. Green coffee berries ready for roasting are considered to be stable and after roasting they are considered as perishable. Great care is exercised in processing and marketing coffee to decrease the deterioration thereof. Expensive machinery and packaging processes are extensively employed for the purpose of retaining as much of the flavor of the coffee as possible during the time between roasting and ultimate consumption.

In order to overcome the problems involved in the above practice, it is an object of our invention to provide a coffee roaster suitable for use by the retail merchant to roast coffee as ordered by the consumer.

Another problem encountered in the coffee industry is that of roasting the berries to the proper degree. Different kinds and different blends of green berries require different roasting periods, the roasting usually being done by highly skilled experts who can determine when the various types of coffee are properly roasted by the color of the berries, aroma, and the sound of berries being roasted.

It is, accordingly, another object of our invention to provide a coffee roaster which may be operated by an unskilled operator to properly roast any kind or most blends of berries.

In order to enable the retail merchant to roast coffee as ordered, it is essential that the roasting take as little time as possible. The most commonly used methods of roasting require about twenty minutes per roast which is too long to enable the retail merchant to do the roasting.

It is another object of the present invention to provide an apparatus for roasting coffee in a much shorter time than previously required.

A further object of our invention is the provision of a coffee roaster combined with a cooling unit to enable cooling the roasted berries immediately after roasting for the purpose of arresting the roasting process and to permit packaging the coffee immediately after roasting.

Still another object of the present invention is the provision of a coffee roaster in which means is provided for separating the chaff from the berries during the roasting process.

Another object of our invention is the provision of a combined roasting and cooling unit in which the operation is entirely automatic from the time the berries are introduced into the roasting unit until they are discharged from the cooling unit.

Other objects and advantages will become apparent in the following description taken in view of the accompanying drawings in which:

Fig. 3 is a vertical sectional view taken on the line 3—3 of Fig. 1.

Fig. 4 is a fragmentary vertical sectional view taken on the line 4—4 of Fig. 3.

Fig. 5 is a fragmentary vertical sectional view taken on the line 5—5 of Fig. 3.

Figs. 10 and 11 are horizontal sectional views taken on the lines 10—10 and 11—11 respectively of Fig. 3.

Figure 1:
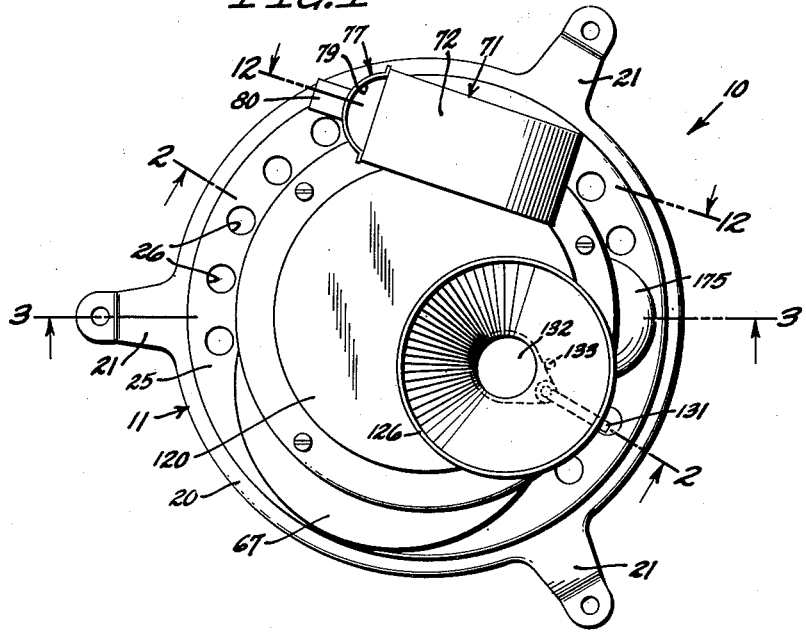
Fig. 1 is a plan view of a preferred form of coffee roasting apparatus of our invention.

Fig. 12 is a fragmentary vertical sectional view taken on the line 12—12 of Fig. 1.

Fig. 13 is a fragmentary vertical sectional view taken on the line 13—13 in Fig. 12.

Fig. 14 is a wiring diagram of the coffee roaster of our invention.

Fig. 14A is a fragmentary diagrammatic view showing a portion of the wiring diagram of a slight modification of the apparatus of our invention.

Fig. 15 is a side elevational view of a control unit for use in connection with our invention.

Fig. 16 is a plan view of the control unit shown in Fig. 15.

Fig. 17 is a vertical sectional view taken on the line 17—17 of Fig. 15.

Figure 18:
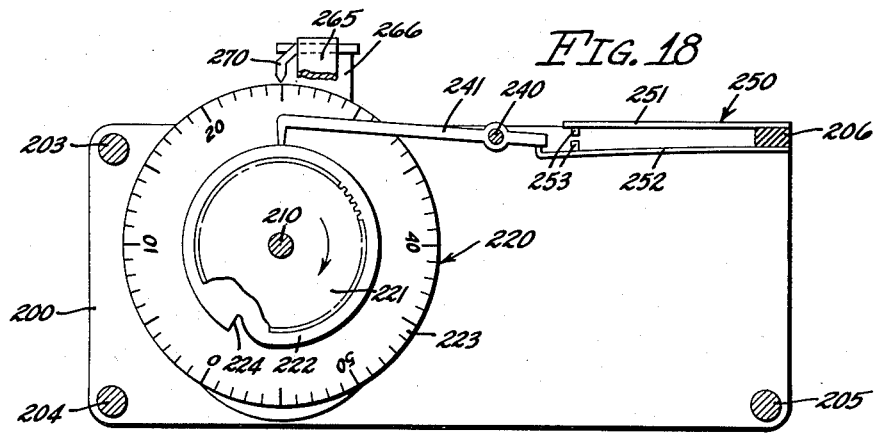
Figure 19:
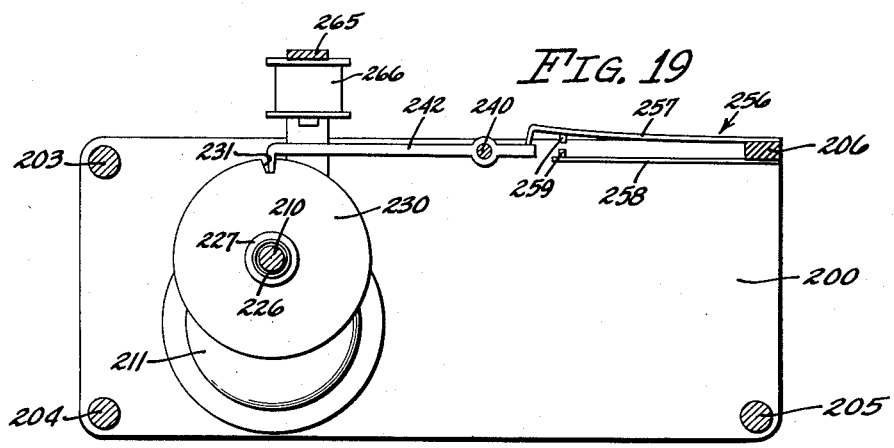
Figure 20:
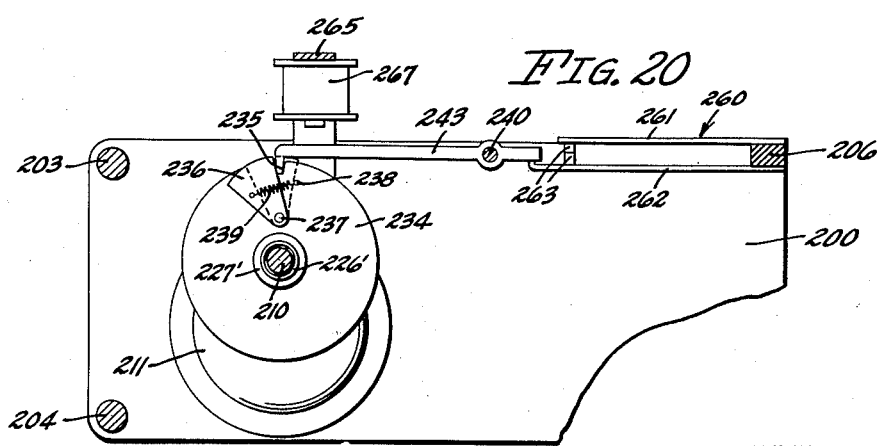

Figs. 18, 19, and 20 are vertical sectional views taken on the lines 18—18, 19—19, and 20—20 respectively of the Fig. 16.

Referring specifically to the drawings, a coffee roaster 10 of our invention is shown generally in Fig. 3. The roaster 10 includes a frame 11, a cooling unit 12, a roasting unit 13, and a control unit 14.

The frame 11 comprises a circular base 20, having legs 21 thereon and formed to provide an opening 22 shaped as seen in Figs. 3 and 11. Fixed on the base 20 is a circular housing 25 having openings 26 on top as seen in Figs. 1 and 3. Mounted above the housing 25, by means of rods 30 and spacers 31, are spaced plates 32, 33, and 34.

Cooling unit 12

The cooling unit 12 includes an annular wall 40 mounted within the housing 25 as shown in Figs. 3 and 11. Mounted on the lower extremity of the wall 40 by means of hinges 41 and 42 is a pair of doors 43 and 44. These doors, as seen in Fig. 11, are semicircular in shape and are made of suitable frames to which metal screen 45 is secured. Fixed on the hinge 41, as shown in Fig. 3, is a finger 46 which moves with the door 43 in a manner and for a purpose to be described hereinafter. As shown in Fig. 11, fingers 48 are fixed at opposite sides of the door 43, these fingers being disposed beneath pins 49 which are attached to the door 44. When, as later described, the door 43 is lowered to open position or raised to closed position, the door 44 is also opened and closed by means of the fingers 48 and pins 49.

Positioned within the housing 25, as seen in Figs. 3, 4, and 11, is a magnetically operated latch 52. The latch 52 includes a coil 53 having a C-shaped core 54, the latter being supported on the wall 40 by pins 55 shown in Fig. 4. Pivotally mounted to one pole of the core 54 is a keeper 56 notched to receive an extension 57 formed on the door 43. The keeper 56 is normally retained in the position in which it is shown in Fig. 4 by a spring 58 and a stop 59. The lower end of the keeper 56 is so shaped as to permit the door 43 to rise into engagement therewith.

Also included in the cooling unit 12 is a blower 65 having a rotor 66 and a housing 67, the latter having an intake mouth 68 formed at the lower side thereof. The blower housing 67 is suitably mounted on the housing 25 as shown in Figs. 3 and 10. The blower 65 has a discharge mouth indicated at 70 in Fig. 10. Extending vertically from the discharge mouth 70 of the blower housing 67 is a vertical exhaust pipe 71, the latter being rectangular in cross section and extending from the blower 65 upward to the top of the coffee roaster 10.

As seen in Figs. 12 and 13, the upper extremity of the exhaust pipe 71 is closed by a semicircular top 72. A vertical slot 73 is formed in a wall of the pipe 71, as seen in Fig. 13, this slot being covered by a vertical series of louvers 74. Formed in another wall of the pipe 71 is an opening 75 there being a wall 76 mounted within the pipe 71. Removably mounted in the opening 75 is a chaff trap 77, the latter having a cylindrical screen 78 which is open at its upper end to receive air blown upwardly through the pipe 71. The trap 77 has an air outlet opening 79 and a handle 80.

Roasting unit 13

Figure 6:
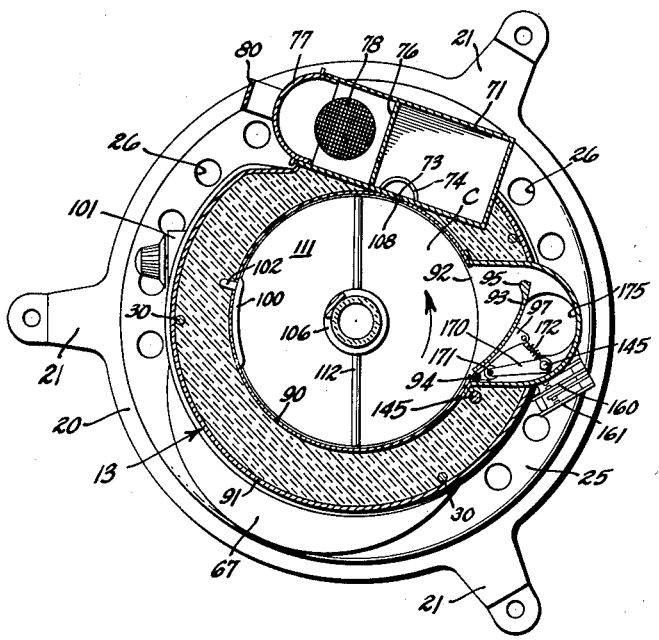
Fig. 6 is a horizontal sectional view taken on the line 6—6 of Fig. 3.
Figure 7:
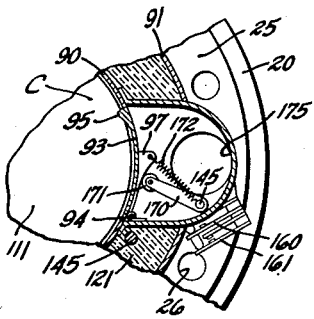
Fig. 7 is a fragmentary sectional view showing the closed position of a door shown in Fig. 6.

The roasting unit 13 is formed by spaced inner and outer walls 90 and 91 respectively these being disposed between the plates 33 and 34 to form a roasting chamber C as seen in Fig. 3. The inner wall 90 is formed to provide an outlet opening 92, the latter being opened and closed by means of a door 93, as seen in Figs. 6 and 7 respectively. The door 93 is hinged at 94 and is provided with a ridge 95 which is vertically disposed and coextensive with the height of the door 93 the purpose of the ridge 95 being explained later. Mounted on the outerside of the door 93 is a cam 97. Fixed on the inside surface of the inner wall 90, as shown in Figs. 6 and 3, is a thermostatic element 100 the latter controlling an adjustable thermostatic switch element 101 by means of a liquid filled tube, or the like, 102.

Mounted centrally on the underside of the plate 34 is an electric heating element 106, the latter being concentrically disposed within the roasting unit 13. Formed vertically through the wall 90, as shown in Fig. 6, is a slot 108, the latter communicating with the slot 73 of the exhaust pipe 71.

Rotatably mounted in the plates 32 and 33 is a vertical shaft 110 the latter having a cup shaped rotor 111 fixed on the upper end thereof. Formed on the upper face of the rotor 111 is a transverse fin 112. Fixed on the lower end of the shaft 110 is a gear 113 which meshes with a pinion 114 provided on the shaft 115 of an electric motor 116. The motor 116 is bolted to the under side of the plate 32. The lower end of the motor shaft 115 serves to drive the rotor 66 of the aforedescribed blower 65.

Figure 2:
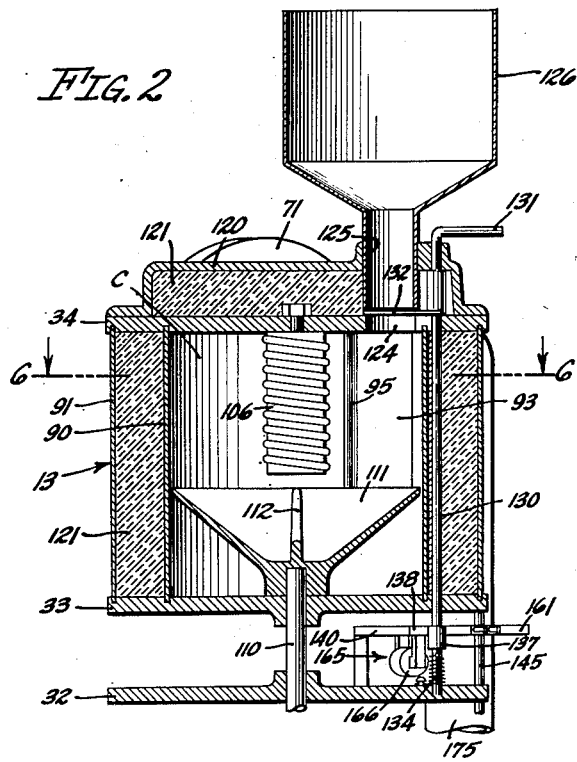
Fig. 2 is a fragmentary vertical sectional view taken on the line 2—2 of Fig. 1.

Mounted on top of the plate 34, as shown in Fig. 2, is a cap 120. The space between the cap 120 and plate 34 as well as the space between the side walls 90 and 91 of the roasting unit 13 is filled with heat insulating material 121 for the purpose of conserving heat within the roasting unit 13. Formed in the plate 34 and cap 120 are aligned openings 124 and 125, the latter having a hopper 126 mounted therein.

The lower surface of the plate 34, the inner surface of the wall 90, and the upper surface of the rotor 111 are preferably gold plated for the purpose of efficiently reflecting the heat rays radiated from the heating element 106.

As shown in Fig. 2, a rotatable rod 130 extends through the plates 32, 33, 34, and the cap 120. The upper end of the rod 130 is bent to provide a handle 131 to permit manual oscillation of this rod. Fixed on the rod 130, between the cap 120 and plate 34, is a shutter 132 which is normally disposed in closing relation with the lower end of the hopper 126 as shown in Figs. 1 and 2. Fixed on the plate 34 is a stop pin 133 which stops the shutter 132 in closed position. Fixed on the rod 130 is a torsion spring 134 which urges the rod 130 in a clockwise direction, as viewed in Fig. 1, so as to urge the shutter 132 against the stop 133.

Figure 8:
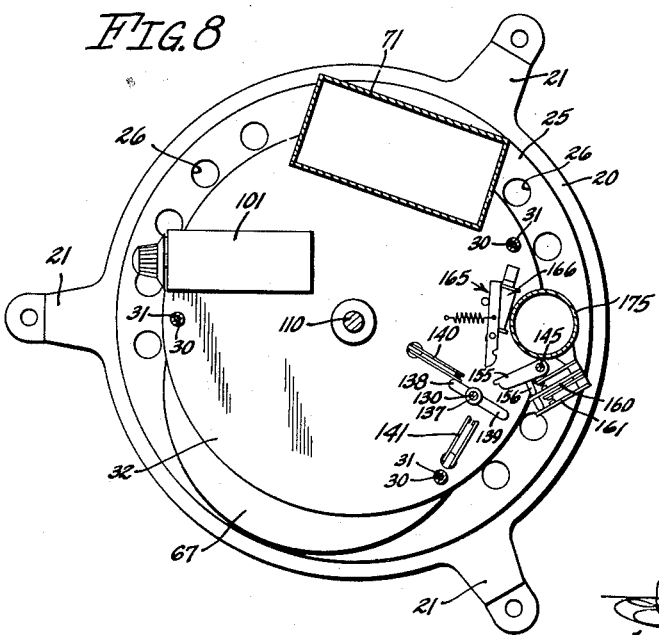
Fig. 8 is a horizontal sectional view taken on the line 8—8 of Fig. 3.
Figure 9:
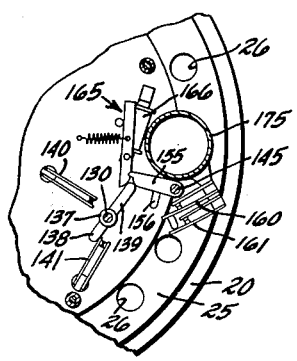
Fig. 9 is a fragmentary sectional view showing a portion of the mechanism shown in Fig. 8 and the manner in which this mechanism operates.

Fixed on the control rod 130 between the plates 32 and 33, as seen in Figs. 2, 8, and 9, is a collar 137 having arms 138 and 139. Mounted on the plate 32 is a pair of switches 140 and 141 these being normally open. These switches are positioned so that one or the other is closed by the extension 138 of the collar 137 when the latter is in either of the positions shown in Figs. 8 and 9.

Adjacent the control rod 130 is a secondary control rod 145 this rod being shown in Figs. 3, 6 to 9 inclusive, 10 and 11. The rod 145 is coextensive with the height of the main portion of the roaster 10, the lower end of this rod being journaled in the base 20, as seen in Fig. 3, while the upper end thereof is journaled in the uppermost plate 34. Fixed on the lower end of the secondary control rod 145, as shown in Figs. 3 and 11, is a collar 148 having fingers 149 and 150 extending laterally therefrom. The finger 149 is curved, as seen in Fig. 11, and positioned to engage the finger 46 of the door 43 of the cooling unit 12. The finger 150 is attached to an extension spring 151 the latter being provided for the purpose of urging the rod 145 counterclockwise to the position in which it is shown in Fig. 11. As seen in Figs. 8 and 9, an arm 155 is fixed on the rod 145, the arm 155 having a pin 156 extending from one side thereof. The arm 155 is urged to the position in which it is shown in Fig. 8 by the aforementioned spring 151 shown in Fig. 11. Mounted adjacent the arm 155 is a pair of switches 160 and 161 these being normally closed as seen in Fig. 9. These switches are simultaneously opened by the pin 156 of the arm 155 when the latter is in the position in which it is shown in Fig. 8.

Mounted on the plate 32 adjacent the arm 155 is a magnetic latching unit 165 having a coil 166, the unit 165 being similar in construction and operation to the aforedescribed magnetic latching unit 52 of the cooling unit 12. The latching unit 165 functions to retain the arm 155 in the position in which it is shown in Fig. 9 and to automatically release this arm as hereinafter described.

Shown in Figs. 6 and 7 is an arm 170 fixed on the secondary control rod 145, this arm having a roller 171 mounted on its extremity. The roller 171 rides on the cam 97 of the door 93, the latter being urged rightward against the roller 171 by an extension spring 172 which is hooked on the cam 97 and control rod 145.

In Figs. 3, 5 and 6 to 9 inclusive a vertical pipe 175 is shown which extends downward from the opening 92 of the roasting unit 13 into communication with the cooling unit 12. As seen in Fig. 3, the pipe 175 is provided with a butterfly valve 176 operated by a crank 177. Mounted on the housing 25 adjacent the pipe 175 is a butterfly valve control unit 180. This unit includes a C-shaped core 181 having a coil 182 thereon. Pivotally mounted on the upper pole of the core 181 is a lever 183 notched at its upper end to operably engage the crank 177 of the valve 176. Extending from the pipe 175 is a stop pin 185, the lever 183 being normally urged against this pin by an extension spring 186. The unit 180 functions to close the butterfly valve 176 when the coil 182 is deenergized, as seen in Figs. 3 and 5, and to open this valve when the coil 182 is energized.

*Control unit 14*

Reference is now made to Figs. 15 to 20 of the drawings in which the control unit 14 of the coffee roaster 10 is shown. This unit is provided for the purpose of controlling the various electrical elements of the coffee roaster and may be used remotely or mounted directly on the frame 11 as preferred. The present disclosure shows the unit 14 separate from the frame 11 and to be used in remote relation to the roaster 10.

The control unit 14 includes a pair of side plates 200 and 201, these being secured in spaced relation by three transverse rods 203, 204, 205, and a bar 206, the latter being made of insulating material. Journaled transversely between the plates 200 and 201 is a shaft 210, this shaft being driven at a rate of one revolution per minute by a synchronous electric motor 211 mounted on the plate 200. Fixed on the shaft 210, as seen in Figs. 16 and 17, are set collars 215, 216, and 217. Adjacent the collar 217 is an element 220, as seen in Figs. 16, 17, and 18, this element being rotatably mounted on the shaft 210. The element 220 is formed to provide a gear wheel 221, a cam 222, and a dial 223. The cam 222 is formed to provide a notch 224 as seen in Fig. 18. The dial 223 is graduated into sixty divisions each of these divisions indicating one second. The element 220 is urged against the collar 217 by a compression spring 226 positioned on the shaft 210 between washers 227 and 228. Rotatably mounted on the shaft 210 between collar 216 and washer 227 is a cam 230 having a notch 231 formed in its periphery as seen in Fig. 19.

The spring 226 urges the washers 227 and 228 against the cam 230 and element 220, respectively. This arrangement permits the element 220 to be manually rotated, as later described, while the cam 230 is held against rotation. The washers 227 and 228 are made of a material such as fiber or the like having a relatively high coefficient of friction so that when the cam 230 is held against rotation during rotation of the shaft 210, the element 220 is also held against rotation by the spring 226 and washers 227 and 228. When the cam 230 is permitted to rotate with the shaft 210, as hereinafter described, the element 220 also rotates.

Rotatably mounted on the shaft 210 adjacent the collar 215 is a cam 234 having a notch 235 formed in its periphery as shown in Fig. 20. Pivotally mounted on the cam 234 is a guard plate 236 pivoted at 237. Extending from the cam 234 is a pin 238 to which one end of an extension spring 239 is fixed, the opposite end of this spring being attached to the guard 236. The spring 239 tends to urge the guard 236 rightward, as viewed in Fig. 20, to the dotted line position with the rightmost edge of the guard 236 engaging the pin 238.

On the shaft 210 adjacent the cam 234 is a washer 227' and a spring 226', the latter urging the cam 234 against the collar 215 so as to frictionally connect the cam 234 and shaft 210.

Pivoted on a rod 240 extending between the plates 200 and 201 are three levers 241, 242, and 243 these being disposed in radial alignment with the cams 222, 230 and 234 respectively. The three levers are positioned on the rod 240 by means of collars 246 and spacers 247. Each of the levers 241, 242, and 243 has a downturned end as seen in Figs. 18, 19, and 20.

Fixed on the bar 206 in alignment with the lever 241 is a switch 250 having upper and lower leaves 251 and 252 respectively as seen in Fig. 18. The lower leaf 252 extends beneath one extremity of the lever 241. Fixed on the leaves 251 and 252 are contact points 253. The switch 250 is normally closed and is opened by the lever 241 when the latter is in the position in which it is shown in Fig. 18.

Mounted on the bar 206 in alignment with the lever 242 is a switch 256 having upper and lower leaves 257 and 258, as shown in Fig. 19, the leaves 257 and 258 having contact points 259. The upper leaf 257 extends over the extremity of the lever 242 and is engaged thereby as seen in Fig. 19. The switch 256 is normally closed and is opened when the downturned end of the lever 242 drops into the notch 231 of the cam 230. Fixed on the bar 206 is a third switch 260 positioned in alignment with the lever 243. The switch 260 has upper and lower leaves 261 and 262 respectively and a pair of contact points 263. The lower leaf 262 of the switch 260 extends under the extremity of the lever 243. The switch 260 is normally closed and is permitted to remain in closed position when the downturned extremity of the lever 243 drops into the notch 235 of the cam 234.

Mounted on the plates 200 and 201 is a transverse member 265 having a pair of magnets 266 and 267 mounted on the under side thereof. The magnet 266 is vertically aligned with the lever 242 while the magnet 267 is vertically aligned with the lever 243. Also mounted on the member 265 is a pointer 270 the latter extending into close proximity with the periphery of the graduated dial 223.

Rotatably mounted on the plate 201, as seen in Fig. 16, is a shaft 274 having a beveled pinion 275 fixed on its inner end and a nob 276 fixed on its outer end. Mounted on the shaft 274 between the plate 201 and the nob 276 is a compression spring 278. In addition to being rotatable, the rod 274 is slidable axially to permit pushing the rod inward until the pinion 275 meshes with the gear 221 of the member 220. Rotation of the shaft 274 while in the inward position imparts rotation to the member 220 for a purpose to be described hereinafter.

Reference is now made to the wiring diagram shown in Fig. 14. Electric current is supplied from a suitable source to the various electrical elements of our invention by means of lead wires 290 and 291 which pass through a main switch S. The lead wire 291 extends to one terminal of the heating element 106, the opposite terminal of this heating element being joined by a wire 292 with the contact of a switch 293 of the thermostat 101, the switch 293 being thermally controlled in accordance with the temperature of the thermostatic element 100 and setting of the thermostat 101. The lead wire 290 extends to the arm of the switch 293, it being clear that whenever the switch 293 is closed the heating element 106 is energized.

The remaining circuit is controlled by a relay 295, the latter comprising a coil 296, a switch 297 having an arm 298 and contact point 299. A wire 300 connects the contact point 299 of the relay 295 with the lead wire 290. The coil 296 of the relay 295 is joined to the lead 290 by a wire 305 and to the switch 140 by a wire 306. Extending from the opposite side of the switch 140 is a wire 307 which extends to a wire 308 which connects one side of the switch 160 to the arm of the switch 256. The contact of the switch 256 is connected by a wire 309 to the remaining side of the switch 160 it being noted that the wire 309 is joined to the lead wire 291.

The main drive motor 116 is connected to the lead 291 by a wire 312 and to the arm 298 of the relay switch 297 by a wire 313, the motor 116 being thus controlled by the relay. The synchronous motor 211 of the control unit 14 is connected to the lead wire 291 by a wire 316 and is connected by a wire 317 to the wire 313. The switch 141 is connected by a wire 318 to the lead wire 290 and the opposite side of the switch 141 is joined by a wire 319 to one terminal of the coil 267 of the control unit 14. The opposite terminal of the coil 267 is connected to the lead 291 by a wire 320.

The switch 161 is connected by a wire 324 to one terminal of the coil 266 of the control unit 14, the remaining terminal of the switch 161 being joined with one terminal of the heating element 106 by a wire 325. The coil 166 is joined in parallel by wires 329 and 330 with the coil 182 of the butterfly valve control unit 180. The wire 329 is connected to a wire 331 which extends to the arm of the switch 250 of the control unit 14. The wire 330 is joined to the lead 290 by a wire 332. One terminal of the coil 53 of the latch unit 52 is connected by a wire 335 to the wire 324, the opposite terminal of this coil being joined by a wire 336 to the contact of the switch 260 of the control unit 14.

Connecting the wire 336 with one terminal of the coil 266 of the control unit 14 is a wire 338. The contact point of the switch 250 of the control unit 14 is connected with the lead 291 by a wire 340. Extending from the arm of the switch 260 of the control unit 14 to the wire 317 is a wire 342.

Operation

Prior to a detailed description of the operation of the method and apparatus of our invention, the general mode of operation will be pointed out so that the detailed description of the operation may be more readily understood.

The rotor 111 of the roasting unit 13, during operation of the roaster 10, is preferably driven at a speed sufficient to throw the coffee berries from this rotor and cause them to climb the inner wall 90 in a spiral path. In practice a speed of approximately 800 R. P. M. of an eight inch diameter rotor has been found sufficient to throw the berries in this manner. This action causes the mass of coffee berries within the roasting unit 13 to substantially cover the inner surface of the wall 90. As the mass of berries moves rapidly about the inside of the wall 90, the vertical ridge 95 on the door 93 deflects the berries from their normal path within the roasting unit.

Figure 2A:
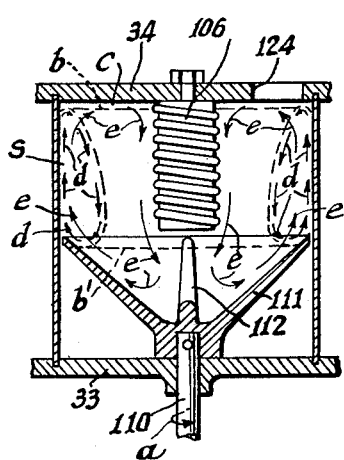
Fig. 2A is a fragmentary vertical sectional view similar in part to Fig. 2 showing diagrammatically the manner in which material being roasted circulates within the roasting chamber of the apparatus of our invention.

The movement of the coffee berries within the roasting chamber C, during operation of the roaster 10, is diagrammatically illustrated in Fig. 2A. In this view the rotor 111 is understood to be rotating at approximately 1500 to 1700 peripheral feet per minute in the direction indicated by the arrow a. A mass of coffee berries being roasted is suspended within the chamber C in an annular shape S having an approximate cross-sectional formation as defined by the dotted lines in Fig. 2A. The horizontal dotted line b defines the approximate uppermost extent of the annular shape S while the horizontal dotted line b' defines the approximate lowermost extremity of the shape S. As illustrated, the lower edge of the annular mass of berries extends only slightly below the upper edge of the fin 112.

The coffee berries follow substantially the path indicated by the short arrows d within the shape S. Starting at the bottom, the berries are engaged and rotated by the fin 112 of the rotor 111. The centrifugal force acting on the berries thus engaged, causes them to ascend the wall 90 in a helical path, their speed reducing as they ascend toward the uppermost extremity b of the annular shape S. At this point, the berries begin their downward movement and are displaced inward from the wall 90 by other rising berries.

The vertical ridge 95, see Figs. 2 and 7, deflects the berries from their normal path of movement about the wall 90. The effect of the ridge 95 is to loosen up the mass of berries comprising the shape S and to slow the rate of travel of the berries which results in less time being required for the berries to progress from the rotor 111 to the top of the shape S and back to the rotor again. The ridge 95 also functions to turn the individual berries over and prevent the berries, which are somewhat flat on opposite sides, from riding up the wall with the same side of each berry disposed against the wall 90.

The downward movement of the berries takes place substantially on the inner diameter of the annular shape S. It is during this downward movement that the berries are exposed to the maximum amount of radiant heat from the element 106. As the berries circulate in the direction indicated by the short arrows $d$ in Fig. 2A, they are also rotating about the heating element 106 so that the actual path followed by the berries is helical.

While the coffee berries are circulating as above described, the atmosphere within the chamber C is also circulated by the rotor 111 in the path indicated by the long arrows $e$ in Fig. 2A. A reduced pressure area at the center of the rotor 111 draws heated atmosphere down from about the heating element 106 and forces this heated atmosphere outward and upward through the mass S of coffee berries. Thus the hottest atmosphere within the chamber is effectively forced through the coffee berries.

This method of circulating coffee berries during the roasting process has proven highly satisfactory. The berries are moved rapidly at all times which prevents any one berry from being overexposed to the heating element. This rapid movement also dissipates the film of gas which forms about each berry during the roasting process.

When stationary coffee berries are subjected to the intense radiant heat from the element 106 without being circulated so as to dissipate the gas film tending to surround each berry, the outer surfaces of the berries are burned and the center portions are under-roasted. The theory supporting this fact is that radiant heat from the element 106 readily passes through the gas film to the coffee berry and quickly heats the outer surface of the berry. The heat thus transmitted to the surface of the berry cannot escape outward from the berry by convection except at a very slow rate due to the high insulating property of the gas film surrounding the berry. As the rate of conduction of heat from the surface toward the center of the berry is relatively slow, the surface is scorched or over-roasted while the center remains under-roasted. Thus, when the gas film is substantially and continuously dissipated as by applicants' roaster, the berry surface is protected against scorching because the excess heat from the surface is free to transfer to the atmosphere within the roasting chamber.

During the period when the heating element 106 is fully energized, the heat transferred to the coffee berries is conducted from the outer surfaces of the berries to the center thereof, the outer surfaces being protected against scorching by removal of the gas film as described.

It will be noted in Figs. 3 and 6 that the heat responsive element 100, which is connected with the thermostatic switch 101, is so positioned within the roasting unit 13 as to offer as little obstruction as possible to the circular movement of the berries as they move along the wall 90.

During the roasting process the element 100 is substantially covered by the coffee berries disposed against the wall 90 thus protecting the element 100 from the heat radiated from the heating element 106.

As the element 100 is covered by the mass of berries circulating within the roasting unit 13, the temperature within this unit rises to a much higher degree than when the roasting unit 13 is empty thus subjecting the berries to a high temperature which accomplishes the first stage of the roasting process, that of dehydrating the berries, in a relatively short time.

When the temperature of the mass of berries in the roasting unit 13 rises to a predetermined point, the thermostatic switch 101 breaks the main circuit (wires 290, 291, and 292) to the heating element 106. At this time the coffee berries are substantially dehydrated and darkened in color so as to absorb heat very readily. The control unit 14 now functions in response to the breaking of the main circuit of the heating element 106 to open the door 93 of the roasting unit 13 when a given period of time has elapsed from the breaking of said main circuit. During this given period of time the final and most critical part of the roasting process occurs.

When the door 93 opens, the rotor 111 quickly throws the berries through the opening 92 and down the pipe 175. The butterfly valve 176, which is normally closed, prevents the suction of warm air downward from the roasting unit 13 into the cooling unit 12. Simultaneously with the opening of the door 93, the magnetic control unit 180 functions to open the butterfly valve 176 and permit the roasted berries to gravitate onto the screen doors 43 and 44 of the cooling unit 12.

At a predetermined time after the passage of the berries into the cooling unit 12, the magnetic latch 52 is energized permitting the doors 43 and 44 to open downward to dump the cooled berries through the opening 22 of the base 20 into a suitable receptacle (not shown). The doors 43 and 44 of the cooling unit 12 are closed automatically, as later described, upon the introduction of a subsequent batch of green berries into the roasting unit 13.

The manner in which the various mechanical and electrical elements of the apparatus of our invention function to accomplish the above described mode of operation is as follows:

The first step in operating the coffee roaster 10 of our invention is to close the main switch S which immediately energizes the heating element 106 located in the roasting unit 13. This heating element remains energized when the roasting unit 13 is empty until the temperature within the roasting unit 13 rises sufficiently to open the switch 293 of the thermostat 101 so as to break the main circuit to the heating element 106. When a quantity of coffee berries is being roasted in the unit 13, the heating element 106 remains energized until the temperature of the berries being roasted rises to a predetermined degree. It has been found in practice that the thermostat 101 may be set at 300 to 400 degrees Fahrenheit to produce satisfactory results.

The dial 223, or the thermostat 101, is now adjusted, if necessary, to determine the length of a period during which the berries are retained in the roasting unit 13 after the supply of current to the heating element 106 is reduced.

The dial 223 is rotated by pushing in on the nob 276 until the gears 221 and 275 mesh and then rotating the nob 276 to obtain the desired adjustment. It is to be noted that the gear 221, the dial 223, and the cam 222 all rotate together during this adjustment.

As indicated by the arrow in Fig. 18, the element 220, which includes the gear, cam, and dial, is driven clockwise by the shaft 210. The numbers on the dial 223 indicate the length of time required for the downturned end of the lever 241 to drop into the notch 224 when the element 220 begins rotation.

During the operation of the coffee roaster 10, the only time that the dial 223 need be adjusted is to vary the degree to which the coffee is roasted. If a dark roast is preferred, the dial 223 is adjusted to increase the length of time that the berries remain in the roasting unit after the reduction of current to the heating element 106. If a light roast is preferred, the dial is rotated so as to decrease the roasting period. In addition to adjusting the dial 223 to vary the color of the finished roast, similar results can be obtained by adjustments of the adjustable thermostat 101. When the thermostat 101 is adjusted to increase the temperature at which the main circuit of the heating element 106 cuts out, the temperature within the roasting unit 13 is raised correspondingly which results in a dark roast. Likewise, opposite adjustment of the thermostat 101 results in a lighter roast.

After the dial 223 is thus adjusted, the green coffee berries to be roasted are dumped into the hopper 126, and the lever 131 on the upper end of the control shaft 130 is swung in a counterclockwise direction, as viewed in Figs. 1 and 14, thus swinging the shutter out from under the hopper 126 and permitting the berries to fall into the roasting unit 13 and onto the rotor 111. When the lever 131 and shaft 130 are rotated in this manner, the lever 138, shown in Figs. 8 and 14, swings out of engagement with the switch 140 and into engagement with the switch 141 as shown in Fig. 9. It will be noted in the wiring diagram shown in Fig. 14 that when the switch 141 is thus closed, the circuit to the magnet 267 of the control unit 14 is thus closed causing the lever 243 to be lifted by this magnet out of engagement with the periphery of the cam 234. When the lever 243 is thus lifted, the normally closed switch 260 is opened for the purpose of breaking the circuit to the magnet 266 of the control unit 14 so as to render the magnet 266 inoperative until the switch 260 is again closed.

When the lever 243 is lifted by the magnet 267, the guard plate 236 of the cam 234 swings rightward from the solid line position in which it is shown in Fig. 20 to the dotted line position shown therein. As the magnet 267 is only momentarily energized as a result of the momentary closing of the switch 141, the lever 243 is immediately dropped after being lifted, this occurring when the shaft 130 is permitted to return to its normal position shown in Fig. 14. It will be noted in Fig. 20, that when the lever 243 is dropped the guard 236 prevents the downturned end of the lever 243 from reentering the notch 235. The end of the lever 243, while resting on the upper edge of the guard 236, does not prevent the cam 234 from rotating when the shaft 210 begins its rotation.

By comparing Figs. 8 and 9, it will be seen that when the rod 130 is rotated counterclockwise to allow the berries to pass from the hopper 126 into the roasting unit 13, the finger 139 on the rod 130 engages the arm 155 and swings the latter from position in which it is shown in Fig. 8 to that shown in Fig. 9. This motion of the arm 155 rotates the secondary control rod 145 clockwise and allows the switches 160 and 161 to assume their normal closed positions. The arm 155 is now latched in the position shown in Fig. 9 by the magnetic latch 165. As soon as the coffee berries pass from the hopper 126 into the roasting unit 13, the lever 131 is allowed to return to its normal position and is urged toward this position by the torsion spring 134, shown in Fig. 2. The shutter 132 is now again positioned in closing relation with the discharge outlet of the hopper 126.

Referring to Fig. 14, it will be noted that upon the return movement of the control rod 130, the arm 138 again engages and closes the switch 140 which completes the circuit to the coil 296 of the relay 295. This circuit is completed through the switch 160 which, although shown open in Fig. 14, is closed following the latching of the arm 156 just described. When the relay 295 is thus energized, the switch arm 297 thereof closes against the contact 299 completing the circuit to the main drive motor 116 and the synchronous motor 211.

When the arm 155 is engaged and moved by the arm 139, as just described, the rotation of the control rod 145 from the position shown in Fig. 8 to that of Fig. 9 swings the arm 170, shown in Fig. 6, to the position in which this arm is shown in Fig. 7. This closes the door 93 so as to retain the berries within the roasting unit 13, this action occurring just prior to the time the rotor 111 of the roasting unit 13 starts rotating.

By reference to Fig. 11, it will be seen that when the rod 145 is rotated clockwise, as just described, the curved finger 149 is swung rightward out of engagement with the finger 46 of the door 43, the latter being retained in closed position by the magnetic latch 52. It will also be noted in Fig. 11 that the clockwise rotation of the control rod 145 extends the extension spring 151 which serves to rotate the rod 145 in a counterclockwise direction at a time hereinafter mentioned.

The various functions just described which occur in response to the opening and closing of the shutter 132 are reviewed in the following outline:

When the control rod 130 is rotated counterclockwise, as viewed in Figs. 1, 6, 8, and 14, the following functions are accomplished:

1. The shutter 132 (see Figs. 1, 2, and 14) is swung out from under the hopper 126 to permit the green coffee berries to gravitate into the roasting unit 13.

2. The switch 140, see Fig. 9, is allowed to open (the opening of the switch 140 having no function at this point in the operation).

3. The switch 141, see Fig. 9, is momentarily closed by the finger 138 completing the circuit to the magnet 267 of the control unit 14 which results in the lever 243 being lifted from the notch 235 of the cam 234 and allowing the guard 236 to swing to the dotted line position in which this guard is shown in Fig. 20.

4. The arm 155 is swung clockwise and latched by the magnetic latch 165.

5. Energy is stored in the torsion spring 134 shown in Fig. 2.

When the rod 130 is permitted to rotate counterclockwise immediately following its clockwise rotation, the following occurs:

1. The switch 141 is permitted to open as the arm 138 disengages this switch which results in breaking the circuit to the magnet 267 and allowing the lever 243 to drop on top of the guard 236. When the lever 243 drops on top of the guard 236, the switch 260 is held open to render the magnet 266 inoperative until the switch 260 is again closed.

2. The shutter 132 is returned to closing relation with the hopper 126.

3. The switch 140 is closed (see Fig. 14) energizing relay 295.

The functions of the rod 145 resulting from clockwise movement of this rod from the position shown in Fig. 8 to that shown in Fig. 9 are as follows:

1. The door 93 is closed as shown in Fig. 7.

2. The extremity of the arm 155 engages the magnetic latch 165 to retain the arm 155 in the position shown in Fig. 9 thus holding the door 93 closed.

3. The switches 160 and 161 are permitted to close, the switch 160 permitting the circuit to the relay 295 to be closed when the switch 140 is closed. The switch 161 completes the circuit to the magnet 266 of the control unit 14 and the magnet 53 of the magnetic latch 52. It is to be noted in the wiring diagram of Fig. 14 that when the switch 161 is thus closed completing the circuit to the magnets 266 and 53 these magnets are not energized until the switch 293 of the thermostatic unit 101 is opened.

4. The finger 149, see Fig. 11, moves out of engagement with the finger 46.

When the motor 116 is energized by the closing of the relay 295, as aforedescribed, the rotor 111 is driven through the gearing 113 and 114 in a counterclockwise direction as indicated by the arrow in Fig. 6. The motor 116 also drives the rotor 66 of the blower 65 in a clockwise direction as viewed in Fig. 10.

The synchronous motor 211 of the control unit 14 is also energized upon the closing of the relay 295 so as to drive the shaft 210 in a clockwise direction as viewed in Figs. 14, 18, 19, and 20. At this point in the operation the cam 230 is retained against rotation on the rotating shaft 210 by engagement of the lever 242 with the notch 231 as seen in Figs. 14 and 19. The cam 222 is held against rotation by the cam 230 (these being frictionally connected by the spring 226 and washers 227 and 228 as shown in Fig. 17). The cam 234, however, is permitted to rotate with the shaft 210 as the lever 243 is held out of engagement with the notch 235 by the guard 236 as aforedescribed.

When the cam 234 has made one complete revolution (one minute after the synchronous motor 211 starts), the downturned end of the lever 243 which rides on the periphery of the cam 234 during rotation of the latter engages the guard 236 pushing this guard leftward, as viewed in Fig. 20, to the solid line position. This allows the lever 243 to drop into engagement with the notch 235 so as to close the switch 260 and complete the circuit to the coil 266 and the coil 53 (these coils, however, are not energized at this moment and do not become energized until the switch 293 of the thermostat 101 opens breaking the main circuit to the heating element 106).

The purpose of providing the cam 234 to disconnect the magnet 266 for one minute is to prevent the magnet 266 from being energized until the heat responsive element 100 is cooled by the introduction of a batch of berries to be roasted into the roasting unit 13. The cam 234, in other words, prevents the berries from being prematurely discharged from the roasting unit 13 should the switch 293 open in the event the roasting unit 13 is hot at the time the unroasted berries are introduced therein. The berries are now continually circulated within the roasting unit 13 and subjected to the heat of the element 106 which remains fully energized until the temperature of the mass of berries within the roasting unit 13 rises sufficiently to open the switch 293 of the thermostat 101 by means of the element 100 and the tube 102 connecting this element with the thermostat 101.

Referring to Fig. 3, the blower 65 draws air downward through the holes 26 of the housing 25, this air passing through the screen doors 43 and 44 into the rotor 66 and is discharged through the exhaust pipe 71. As shown in Figs. 12 and 13, the air moving upward through the pipe 71 passes over the louvers 74 into the cylindrical screen 78 and finally out through the opening 79 of the chaff trap 77. The passage of the air past the louvers 74 draws a small quantity of air from the roasting unit 13 through the slots 108 and 73 shown in Fig. 6. The chaff liberated from the coffee berries during the roasting process passes through these slots into the stream of air within the pipe 71 and is trapped by the screen 78 of the trap 77. By means of the handle 80 the trap 77 may be readily removed when necessary to empty the chaff from the screen 78.

When the mass of berries within the roasting unit 13 is heated to a temperature corresponding with the setting of the thermostat, the heat responsive element 100, which corresponds in temperature to that of the berries, opens the switch 293 of the thermostat 107. Opening of the switch 293 breaks the main circuit to the heating element 106 which allows the coil 266 of the control unit 14 and the coil 53 of the magnetic latch 52 to be simultaneously energized. When the magnetic latch 52 is energized, the lever 56 is swung out of engagement with the extension 57 of the door 43 permitting the latter as well as the door 44 to swing downward into open position thereby dumping any berries previously roasted which may be disposed within the cooling unit 12.

When the coil 266 of the control unit 14 is energized, the lever 242 is lifted thus closing the switch 256 and permitting the cam 230 and the cam 222 to begin rotation. The closing of the switch 256 is for the purpose of maintaining the circuit to the relay 295 after the switch 160 is opened as presently described.

When the cam 222 rotates until the lever 241 drops into the notch 224, the switch 250 is closed which completes the circuit to the coil 166 and the coil 182. The coil 166, when energized, actuates the magnetic latch 165 causing the latter to release the arm 155 allowing this arm to return from the position shown in Fig. 9 to that shown in Fig. 8. This return movement of the arm 155 and control rod 145 attached thereto is caused by the spring 151 shown in Fig. 11. This movement of the rod 145, by means of the curved finger 149 and finger 46, automatically swings the doors 43 and 44 upward into closed position. Movement of the control rod 145, as seen in Fig. 6, also swings the arm 170 from the position shown in Fig. 7 to that shown in Fig. 6 permitting the spring 172 to open the door 93.

As the door 93 opens, the berries are thrown from the roasting unit 13 by the rotor 111 through the opening 92 into the pipe 175. As the coil 182 of the butterfly valve control mechanism 180 is now energized, the lever 183, shown in Figs. 3 and 14, moves clockwise swinging the valve 176 from closed to open position to permit the roasted berries to pass into the cooling unit 12 where they are retained by the closed doors 43 and 44. The passage of cool air upward through the screen doors 43 and 44 rapidly cools the hot berries and arrests further roasting thereof which would result in over roasting of the berries.

When the lever 241 drops into the notch 224 to close the switch 250 and energize the magnets 166 and 182, the cam 222 is not stopped by the lever 241. The shape of the notch 224 simply permits the lever 241 to drop and then cams the lever 241 up to the position shown in Fig. 14.

The time required for the end of the lever 241 to pass into and out of the notch 224 holds the butterfly valve open for a sufficient period to allow all the roasted berries to pass from the roasting unit to the cooling unit.

At this stage of the roasting process the cam 230 and cam 222 continue to rotate until the lever 242 drops into the notch 231 of the cam 230 thus stopping the cam 230 and the cam 222. When the lever 242 drops into the notch 231, the switch 256 is opened to break the circuit to the coil 296 of the relay 295 thus stopping the motors 116 and 211.

This completes the roasting of a batch of berries with the exception of dumping the berries from the cooling unit 12. If a subsequent batch of berries is to be immediately roasted, these are placed into the hopper 126 and the operation previously described is repeated. When the roasting of this subsequent batch of berries progresses to the aforedescribed point at which the coil 266 of the control unit 14 is energized in response to the opening of the switch 293, the magnetic latch 52 functions to dump the cooled berries of the previous roast.

If it is necessary to dump a batch of cooled berries without roasting a subsequent batch of berries, the machine is operated just as though a batch of berries was being roasted and at the proper time in the cycle the magnetic latch 52 functions to release the doors 43 and 44 and discharge the batch of cooled berries.

In the use of the coffee roaster 10 it makes no difference whether the roasting unit 13 is hot or cold at the start of the roasting process described; no adjustments of the machine are required when the berries to be roasted are dumped into a cold or hot roasting unit other than the adjustment of the dial 223 or thermostat 101, in the event a darker or lighter roast is desired than that which the roaster is adjusted to produce.

The roasting process takes longer when the roasting unit 13 is cold at the time the berries are introduced therein than when the unit is hot, but the degree to which the berries are roasted is the same in either event. This is due to the fact that the critical period of the roast (the period between the shutting off of the main circuit of the heating element 106 and the discharge of the berries from the roasting unit 13) is the same in either event.

Reference is now made to Fig. 14A in which we have shown a supplementary heating element 106', this element being connected to the main lead wires 290 and 291. The addition of the heating element 106' comprises a slight modification in the apparatus of our invention, the purpose of which is to provide a roaster in which a relatively small amount of heat is supplied to the roasting unit after the larger heating element 106 is disconnected from the main circuit by the switch 293 at the time the berries being roasted rise to the temperature at which the thermostat 101 is set.

As seen in Fig. 14A, the small heating element 106' is wired so as to receive current at all times when the main switch S is closed. In practice the small element 106' may be mounted at any suitable point within the roasting unit 13 to produce this modification of our invention.

It has been found in practice that successive batches of green berries may be roasted in the roaster 10 of our invention to a constant degree or color regardless of the atmospheric temperature and humidity. It has also been found that the age of the berries to be roasted and the moisture content of these berries does not affect the color resulting from roasting such berries in this roaster. The constant results obtained, regardless of the above noted variable conditions, are due to the control of the heating element 106 in response to the temperature of the berries and to the method herein disclosed of retaining the berries within the roasting unit for a given period after interrupting the main supply of current to the heating element.

If, for example, a dry batch of green berries is roasted, the time required to bring these up to the temperature at which the switch 293 is opened would be less than the time required in the case of a batch of berries having a high moisture content. The color or degree of roasting would be the same in either event.

The rotor 111, in addition to circulating the coffee berries within the chamber C, also functions to circulate hot air in this chamber. The fin 112 on the rapidly rotating rotor 111 throws air outward against the wall 90 while reducing the pressure of the air in the region just over the center of the rotor. The air thrown outward travels up the wall 90 to the plate 34 where it moves inward and is drawn downward over the heating element 106 by the reduced pressure over the center of the rotor. Thus a continuous circulation of air is set up within the chamber C during the roasting process.

The hot air permeates throughout the mass of berries which results in an even distribution of heat to all the berries within the chamber C. This, in addition to the aforedescribed manner in which the berries are circulated while being roasted, insures roasting each berry an equal amount. In actual practice, many successive batches of coffee berries have been roasted in the roaster of our invention and, without exception, the berries were evenly colored indicating an equal absorption of heat by each berry.

Although we have shown but one preferred and one modified form of the apparatus and method of our invention, it is to be understood that many modifications and changes may be made therein without departing from the spirit of the invention or the scope of the appended claims.

We claim as our invention:

1. In a roaster for coffee and the like, the combination of: a roasting chamber for receiving a quantity of material to be roasted, a pair of heating elements for heating said chamber and a thermostatic element for enabling and disabling one of said heating elements, said thermostatic element being so positioned in said chamber as to be insulated from the interior of said chamber by the material being roasted, said thermostatic element disabling said one of said heating elements when the temperature of said material rises to a predetermined degree, the other of said heating elements maintaining the temperature within said chamber at a lower degree after the disabling of said one of said heating elements.

2. In a roaster for coffee and the like, the combination of: a roasting chamber for receiving a quantity of material to be roasted, said chamber having a discharge opening, a door for opening or closing said discharge opening, electric heating means, two circuits leading to said electric heating means, a thermostatic element in the chamber for reducing the energy supply to said electric heating means when the temperature of the material being roasted rises to a given degree, means operated by said thermostatic element for interrupting one of said circuits to the heating means and rendering the second of said circuits leading to said heating means operative, and control means operated by the energy flowing through the second of said circuits for opening the door of said discharge opening at the end of a predetermined period of time after said one of said circuits is interrupted.

3. In a roaster for coffee and the like, the combination of: a roasting chamber for receiving a quantity of material to be roasted, an inlet door for opening and closing the inlet opening of said chamber, an outlet door for opening and closing the outlet opening of said chamber, electric heating means, two circuits leading to said electric heating means, a thermostatic element in the chamber for reducing the energy supply to said electric heating means when the temperature of the material being roasted rises to a given degree, means operated by said thermostatic element for interrupting one of said circuits to the heating means and rendering the second of said circuits leading to said heating means operative, control means operated by the energy flowing through the second of said circuits for opening the door of said discharge opening at the end of a predetermined period of time after said one of said circuits is interrupted, and means responsive to the opening of said inlet door for rendering said control means inoperative for a given period of time.

4. In a coffee roaster, the combination of: a roasting chamber having inlet and outlet doors, means for heating said chamber to roast green coffee berries disposed therein, a thermostatic element in said chamber for controlling said heating means in accordance with the temperature of the berries in said roasting chamber, a motor, a rotary element driven by said motor in said chamber for circulating said berries during the roasting thereof, a switch for controlling said motor, means for opening and closing said inlet door, means operated by said means which opens and closes said inlet door for closing said outlet door in response to opening said inlet door, means operated by said means which opens and closes said inlet door for closing said switch and starting said motor when said inlet door is closed following the opening thereof, and control means responsive to said thermostat for opening said outlet door to permit the discharge of berries from said roasting chamber.

5. A combination as in claim 4 in which said control means opens said outlet door at the end of a given period of time after a control function of said thermostat.

6. In a coffee roaster, the combination of: a roasting chamber having inlet and outlet doors, means for heating said chamber to roast green coffee berries disposed therein, a thermostatic element in said chamber for controlling said heating means in accordance with the temperature of the berries in said roasting chamber, a rotary element in said chamber for circulating said berries during the roasting thereof, a motor for driving said rotary element, means for opening and closing said inlet door, a switch for controlling said motor, means operated by said means which opens and closes said inlet door for closing said outlet door in response to opening said inlet door, means operated by said means which opens and closes said inlet door for closing said switch and starting said motor when said inlet door is closed following the opening thereof, and control means responsive to said thermostat for opening said outlet door to permit the discharge of berries from said roasting chamber after the lapse of a given period of time after actuation of said control means by said thermostat, a cooling unit for receiving and cooling said roasted berries discharged from said roasting chamber, and means for automatically dumping the cooled berries from said cooling unit prior to the discharge of the next successive charge of coffee berries from the roasting chamber.

7. In a roaster for coffee berries and the like, the combination of: a roasting chamber having a top wall and a circular side wall, a rotary element mounted at the bottom of said chamber, fin means extending transversely on the upper side of said rotary element, power means for driving said rotary element at a speed sufficient to impel coffee berries from said element and up said side wall in a spiral path, said berries being repeatedly thrown from said element as said berries decelerate sufficiently to fall from said circular wall to said element, and means for heating said chamber to a degree sufficient to roast said berries.

8. In a roaster for coffee berries and the like, the combination of: a roasting chamber having a top wall and a circular side wall, a rotary element mounted at the bottom of said chamber, fin means extending transversely on the upper side of said rotary element, power means for driving said rotary element at a speed sufficient to impel coffee berries from said element and up said side wall in a spiral path, said berries being repeatedly thrown from said element as said berries decelerate sufficiently to fall from said circular wall to said element, means for heating said chamber to a degree sufficient to roast said berries, and a thermostatic element in said roasting chamber for controlling said heating means, said thermostatic element being positioned relative to said heating means so that the coffee berries disposed against said circular wall are interposed between said heating means and said thermostatic element.

9. In a roaster for coffee berries and the like, the combination of: a roasting chamber having a top wall, a bottom wall, and a circular side wall, said chamber having a door to permit charging said chamber with a quantity of green berries to be roasted, a heating element mounted within said chamber, means for rotating said quantity of berries in said chamber at sufficient velocity to cause said berries to cling by centrifugal force to said circular wall while moving rapidly about said heating element, and means on said circular wall to deflect the berries moving along said circular wall from the normal path of said berries.

10. In a roaster for coffee berries and the like, the combination of: a roasting chamber having a top wall and a circular side wall, a rotor mounted at the bottom of said chamber and rotatable about a vertical axis, a transverse fin on the upper side of said rotor, power means for driving said rotor at a speed sufficient to impel coffee berries from said rotor and up said side wall in a spiral path, a heating element mounted on said top wall and extending downward into said chamber, and a thermostatic element mounted on said side wall for controlling said heating element, said thermostatic element being positioned so as to be covered by said berries during the roasting process to enable said thermostatic element to control said heating element in response to the temperature of said berries.

11. In a roaster for coffee berries and the like, the combination of: a roasting chamber having a top wall and a circular side wall, a rotary element disposed at the bottom of said chamber, fin means on said rotary element, means for driving said rotary element at a speed sufficient to throw coffee berries from said element and maintain said berries in an annular rotating mass against said circular side wall, said side wall having a discharge opening extending substantially from said rotary element to said top wall, and a door adapted to close and open said opening.

12. A combination as in claim 11 in which said door is hinged to said side wall at a vertical edge of said door, the direction in which said door extends away from said hinge being the same as the direction of rotation of said rotary element.

CHARLES E. CUSACK.
HANS H. BERGER.